Aug. 4, 1959 P. SCHLUMBOHM 2,897,970
FILTRATION EQUIPMENT, ESPECIALLY FOR MAKING COFFEE
Filed March 8, 1957
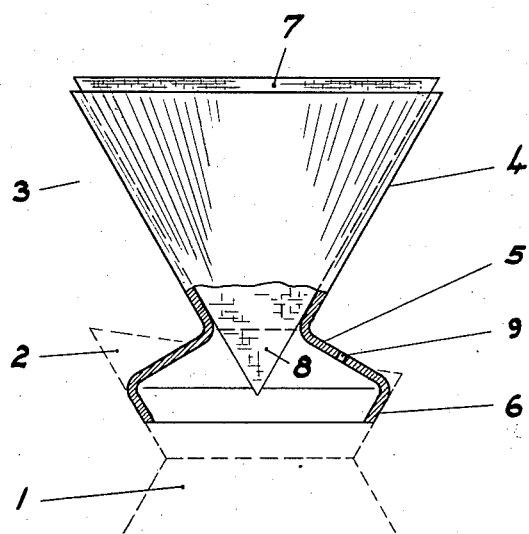
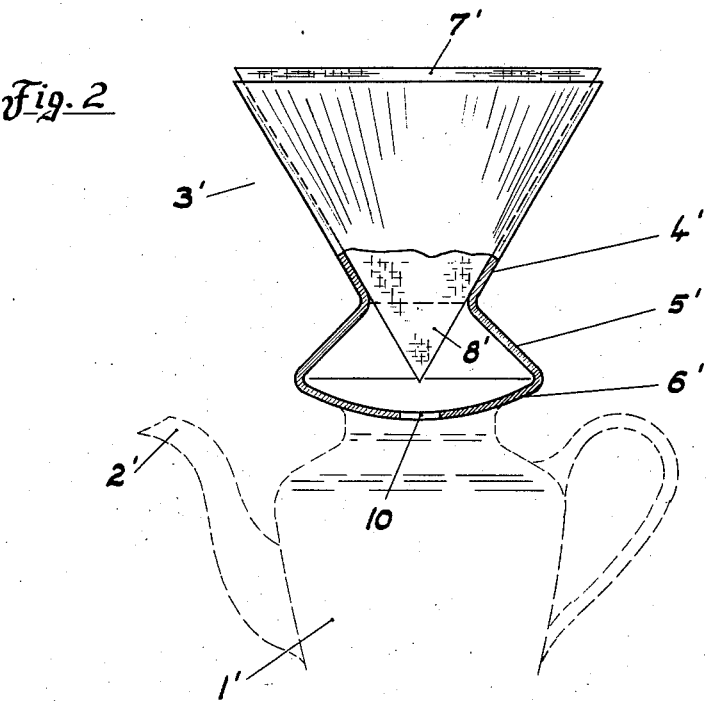
INVENTOR.

United States Patent Office 2,897,970
Patented Aug. 4, 1959

2,897,970

FILTRATION EQUIPMENT, ESPECIALLY FOR MAKING COFFEE

Peter Schlumbohm, New York, N.Y.

Application March 8, 1957, Serial No. 644,818

3 Claims. (Cl. 210—474)

This application is a continuation-in-part of my application Ser. No. 403,013, which has resulted in the U.S. Patent #2,786,577, "Leacher, Especially for Making Coffee or Tea."

The present invention relates to filtration equipment for making coffee. More specifically, the new filtration apparatus is an accessory to be placed and to rest on the walls of the top opening of a conventional coffee-serving container during the filtration period.

The actual filtration equipment is of the type, in which ground coffee is held in a filterpaper cone, which itself is supported only in its upper and middle sections by the walls of a truncated conical funnel, whereas the apex section of the filterpaper cone is hanging freely without being contacted by walls, with the result that hot water poured on the ground coffee will leave the filterpaper cone predominantly through the apex section of the filterpaper, after having passed through the entire column of the coffee for extraction purposes.

Following the invention, the walls of the truncated conical funnel are extended downwardly, concentrically with the axis of the funnel, to wall space with an open bottom through which the filtrate leaves. The downwardly extended walls are integral with the walls of the funnel and they extend in an upper and in a lower section. In the upper section they extend downwardly and outwardly to a diameter which is much greater than the smallest diameter of the funnel, so as to secure a safe base for equipment when heavily loaded with coffee and boiling water, and in their lower section they extend downwardly and inwardly to form the actual base walls. The space walled by the upper and lower section of the downwardly extended walls holds the free hanging apex of the filterpaper cone, which is mechanically very vulnerable and which in this walled space is well protected.

The invention is illustrated in Fig. 1 and Fig. 2 of the accompanying drawings.

Fig. 1 is a side view of the filtration accessory as designed to rest on the walls of the open, conically flared mouth of a conventional coffee-serving carafe. The apparatus is shown partly in view and partly in vertical cross-section. The contours of the carafe are indicated in dotted lines.

Fig. 2 is a side view of the filtration accessory as designed to rest on the walls of the top opening of an old-fashioned coffee-pot, so that some cherished heirloom of china or silver may benefit from a modern filtration technique. Fig. 2 is shown partly in view, partly in vertical cross section. The contours of the coffee-pot are indicated by dotted lines.

The two modifications differ only in the shape of the lower section of the downwardly extended walls, and the reference numbers are analogous.

In Fig. 1 the filtration accessory 3 comprises a truncated conical funnel 4, which supports the upper and middle section of a filterpaper cone 7, whose apex section 8 protrudes through the lower open end of the funnel. From this lower open end of the funnel 4 its walls extend downwardly and outwardly in an upper section 5 and then, in a lower section 6, downwardly and inwardly. In the modification of Fig. 1 the walls of this lower section are conically flared to correspond to the walls of the flared mouth 2 of a coffee-serving carafe 1. Inasmuch as such a tapered joint may during the filtration period prevent air passage, especially when filled under capillary action with condensed water from the steam emanating from the filtered coffee, I provide a vent opening 9 in the upper section 5 of the extended walls. The extended walls extend downwardly below the level of the apex section 8 of the filterpaper funnel, to offer protection for the apex by this walled space. When removed from the server, the accessory can be placed on a saucer or in the sink without danger of breaking the filterpaper.

The modification shown in Fig. 2 differs from the modification shown in Fig. 1 by the shape of the lower section 6' of the downwardly extended walls of the funnel 4'. The walls of this lower section are convex, with an opening 10 in the center. For reasons of clarity, the curvature of the bottom walls is not shown as shallow as it is in practice, where its radius comes from a center point above the center of gravity of the entire device when filled with coffee and water in the filter cone. With such a curvature it can be placed on a table or in a sink without toppling over. When resting the device on the annular walls of the top opening of a coffee-pot, the diameter of the top opening is not critical. Inasmuch as the contact between the walls of the top opening and the walls of the lower section 6' is not gastight and in view of venting through the spout of a coffee-pot, a special venting opening in the upper section 5' of the extended walls is not necessarily required.

The apparatus as shown in Fig. 1 and Fig. 2 is best made from glass. Due to its concentrical walls it can be easily blown in a paste-mould.

Having now declared the nature of my invention and having shown by examples the manner in which it may be performed,

I claim as my invention:

1. Filtration accessory for coffee carafes with a conically flared pouring mouth, characterized by a truncated, hollow conical funnel having an upper open wide end and a lower open narrow end and sidewalls walling the space between the two openings; a disposable conical paper filter having an upper portion with an open top and an apex portion with a closed pointed end; said upper portion being disposed in the funnel and supported by its side walls, said closed pointed end extending out of the narrow open end of the funnel into a walled space having an open bottom and upper and lower side walls which are integral with the side walls of the funnel; the lower side walls being conically shaped, their diameter narrowing towards the open bottom and corresponding to the conically flared pouring mouth of the carafe, whereby the filtration accessory during filtration can be supported by the pouring mouth engaging said lower side walls, with the mechanically vulnerable pointed filter end being shielded and being held above the liquid-capacity lever of the carafe.

2. In a filtration accessory as claimed in claim 1, a vent opening in said upper side walls, whereby the walled space, into which the pointed end of the filter extends, is connected to the atmosphere.

3. Filtration accessory for conventional coffee-pots having a top opening with an annular rim, characterized by a truncated, hollow, conical funnel having an upper open wide end and a lower open narrow end and sidewalls walling the space between the two openings; a disposable conical paper filter having an upper portion with an open top and an apex portion with a closed pointed end; said upper portion being disposed in the funnel and supported by its sidewalls, said closed pointed end extending out of the narrow open end of the funnel into a walled space having an open bottom and upper and lower side walls which are integral with the side walls of the funnel; the lower side walls having a larger diameter than said annular rim and having a convex curvature of a radius from a center point above the center of gravity of the accessory when in operation, loaded with coffee grounds and water held in the disposable paper filter cone, whereby the mechanically vulnerable pointed filter end is shielded and is held above the liquid-capacity level of the coffee-pot.

References Cited in the file of this patent
UNITED STATES PATENTS

| | | |
|---|---|---|
| 356,555 | Ryan | Jan. 25, 1887 |
| 526,637 | Ryan | Sept. 25, 1894 |
| 628,935 | Grube | July 18, 1899 |
| 2,321,639 | Zarbo | June 15, 1943 |
| 2,354,008 | Grey | July 18, 1944 |
| 2,681,154 | Schlumbohm | June 15, 1954 |